United States Patent
Hughes et al.

(10) Patent No.: US 10,353,419 B2
(45) Date of Patent: Jul. 16, 2019

(54) APPARATUS COMPRISING AN ENERGY SOURCE

(71) Applicant: INTELLIGENT ENERGY LIMITED, Loughborough (GB)

(72) Inventors: Julian Anthony Hughes, Loughborough (GB); David Edgar, Loughborough (GB); Daniel Ninan, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 552 days.

(21) Appl. No.: 14/839,371

(22) Filed: Aug. 28, 2015

(65) Prior Publication Data

US 2016/0062381 A1  Mar. 3, 2016

(30) Foreign Application Priority Data

Sep. 2, 2014  (GB) .................................. 1415521.2

(51) Int. Cl.
| | | |
|---|---|---|
| *G06Q 20/14* | (2012.01) | |
| *G05F 1/66* | (2006.01) | |
| *H02J 7/02* | (2016.01) | |
| *G07F 5/12* | (2006.01) | |
| *G07F 15/00* | (2006.01) | |
| *G05B 15/02* | (2006.01) | |
| *G06Q 50/06* | (2012.01) | |
| *H02J 13/00* | (2006.01) | |
| *H04L 29/08* | (2006.01) | |

(52) U.S. Cl.
CPC .............. *G05F 1/66* (2013.01); *G05B 15/02* (2013.01); *G06Q 20/145* (2013.01); *G06Q 50/06* (2013.01); *G07F 5/12* (2013.01); *G07F 15/006* (2013.01); *H02J 7/02* (2013.01); *H02J 13/0003* (2013.01); *H04L 67/1002* (2013.01)

(58) Field of Classification Search
None
See application file for complete search history.

(56) References Cited

U.S. PATENT DOCUMENTS

| | | |
|---|---|---|
| 6,713,201 B2 | 3/2004 | Bullock et al. |
| 8,904,198 B1 | 12/2014 | Pinto et al. |
| 2003/0141840 A1 | 7/2003 | Sanders |

(Continued)

FOREIGN PATENT DOCUMENTS

JP   2007014068   1/2007

OTHER PUBLICATIONS

Great Britain Patent Application No. 1415521.2; Search Report; dated Mar. 10, 2015; 5 pages.

(Continued)

*Primary Examiner* — Robert E Fennema
*Assistant Examiner* — Marzia T Monty
(74) *Attorney, Agent, or Firm* — BakerHostetler

(57) ABSTRACT

Apparatus comprising an energy source (102) configured to provide energy to an energy-consuming device (106). The energy source (102) can be embedded within an item of furniture. The apparatus also includes a communication resource (104) configured to be in communication with a remote sever (108) in order to authorize delivery of a predetermined amount of energy by the energy source (102) to the energy-consuming device (106).

32 Claims, 3 Drawing Sheets

(56) References Cited

U.S. PATENT DOCUMENTS

| | | | |
|---|---|---|---|
| 2010/0174629 A1* | 7/2010 | Taylor | G06Q 20/10 |
| | | | 705/34 |
| 2011/0258110 A1 | 10/2011 | Antoci | |
| 2012/0078413 A1* | 3/2012 | Baker, Jr. | G07F 17/12 |
| | | | 700/232 |
| 2012/0290470 A1* | 11/2012 | Lee | G06Q 20/3278 |
| | | | 705/39 |
| 2013/0132245 A1 | 5/2013 | Hsieh et al. | |
| 2014/0021798 A1* | 1/2014 | Kesler | H02J 17/00 |
| | | | 307/104 |
| 2014/0114447 A1 | 4/2014 | Kim et al. | |
| 2014/0316958 A1* | 10/2014 | Alberth, Jr. | G06Q 10/00 |
| | | | 705/35 |
| 2016/0068075 A1* | 3/2016 | Chen | B60L 11/1822 |
| | | | 320/107 |
| 2016/0156207 A1* | 6/2016 | Frankenberger | H02J 7/0027 |
| | | | 320/101 |
| 2017/0323503 A1* | 11/2017 | Garcia | G07C 9/00309 |

OTHER PUBLICATIONS

"UPP Portable Fuel Cell—The Clean Energy Alternative for Powering USB Devices Receives Industry Certification"; Intelligent Energy; Apr. 28, 2014; 2 pages.

Great Britain Patent Application No. 1415521.2; Search Report; dated Jun. 15, 2015; 3 pages.

GB Search Report dated Jun. 15, 2015 in GB Application No. 1415521.2 filed Sep. 2, 2014.

\* cited by examiner

APPARATUS COMPRISING AN ENERGY SOURCE

This patent application claims priority to Great Britain Patent Application GB1415521.2 filed Sep. 2, 2014, the disclosure of which is incorporated by reference in its entirety.

This disclosure relates to apparatus comprising energy sources, and in particular energy sources and communications resources.

According to a first aspect of the invention there is provided apparatus comprising:
 an energy source configured to provide energy to an energy-consuming device, wherein the energy source is embedded within an item of furniture, and
 a communication resource configured to be in communication with a remote sever in order to authorise delivery of a predetermined amount of energy by the energy source to the energy-consuming device.

The energy source may be configured to be in communication with the remote sever via the energy-consuming device. The energy-consuming device may comprise a mobile communications device.

The communication resource may be configured to receive a signal representative of an instruction for the energy source to deliver the predetermined amount of energy.

The energy source may be a fuel cell energy source.

The predetermined amount of energy may comprise:
 a predetermined absolute amount of energy;
 a predetermined relative amount of energy, such as a predetermined portion of the energy-consuming device's capacity for storing energy; or
 an amount of energy associated with a predetermined period of time.

The communication resource may be configured to send a signal to the remote server that is representative of a request for energy by the energy-consuming device. In other examples, the energy-consuming device can make the request independently of the energy source. The energy source may be configured to receive a signal from the remote server that is representative of a specific predetermined amount of energy to deliver to the energy-consuming device.

There is also disclosed a system comprising:
 an energy source configured to provide energy to an energy-consuming device, wherein the energy source is embedded within an item of furniture,
 a server that is remote from the energy source, and is configured to store energy-usage data associated with the energy-consuming device;
 a communication resource configured to be in communication with the sever in order to authorise delivery of a predetermined amount of energy by the energy source to the energy-consuming device in accordance with the energy-usage data.

The server may be configured to process one or more of the following parameters in order to attribute a status value to the energy-consuming device:
 an amount of time that the energy-consuming device has already been connected to the energy source for a current visit or in a preceding fixed period of time;
 an amount of credit on an account of a user associated with the energy-consuming device;
 a current time of day and/or day of the week;
 a host control signal; and
 another parameter derived from one or more of energy-usage data, user-related data, and information related to non-energy related transactions.

The status value may be representative of "encourage to stay" or "encourage to leave". The server may be configured to process the status value and identify instant deals data for presenting to a user of the energy-consuming device. The instant deals data may comprise one or more of: (i) value information; (ii) supplier information; and (iii) expiry information.

The server may be configured to transmit a first control signal or a second control signal to the energy-consuming device in accordance with the energy-usage data. The first control signal may be an incentive control signal. The second control signal may be a disincentive control signal. The incentive control signal and the disincentive control signal may be configured to enable/disable functionality on the energy-consuming device.

The system may also comprise a location determining component configured to determine position information. The server may be configured to determine a location of the energy source in accordance with the position information, and optionally authorise delivery of the predetermined amount of energy by the energy source at the determined location. The determined location may be an identifier of an individual item of furniture in an establishment.

The server may be configured to update the energy-usage data in accordance with the predetermined amount of energy that is authorised for delivery. The server may be configured to update the energy-usage data in accordance with an amount of energy that is delivered to the energy-consuming device.

The server may be configured to determine if a request for energy is acceptable by processing the energy-usage data and/or user-related data. The server may be configured to determine if the request for energy is acceptable by processing the energy-usage data to determine if the energy source has access to sufficient energy to provide the predetermined amount of energy that has been requested.

The energy source may be configured to perform a handshaking operation with the energy-consuming device before the predetermined amount of energy is delivered. The predetermined amount of energy may only be delivered if a result of the handshaking operation is considered successful.

There is also disclosed a method of operating any apparatus disclosed herein or any system disclosed herein, the method comprising:
 authorising delivery of a predetermined amount of energy by the energy source to the energy-consuming device.

The method may further comprise providing a signal representative of an instruction for the energy source to deliver the predetermined amount of energy. The method may further comprise providing a signal that is representative of a specific predetermined amount of energy to deliver to the energy-consuming device.

The method may further comprise processing one or more of the following parameters in order to attribute a status value to the energy-consuming device:
 an amount of time that the energy-consuming device has already been connected to the energy source for a current visit or in a preceding fixed period of time;
 an amount of credit on an account of a user associated with the energy-consuming device;
 a current time of day and/or day of the week;
 a host control signal; and another parameter derived from one or more of energy-usage data, user-related data, and information related to non-energy related transactions.

The method may further comprise processing the status value and identifying instant deals data for presenting to a user of the energy-consuming device.

The method may further comprise providing a first control signal or a second control signal to the energy-consuming device in accordance with the energy-usage data.

The method may further comprise determining a location of the energy source in accordance with the position information, and optionally authorising delivery of the predetermined amount of energy by the energy source at the determined location.

The method may further comprise determining if a request for energy is acceptable by processing the energy-usage data and/or user-related data. The method may comprise determining if the request for energy is acceptable by processing the energy-usage data to determine if the energy source has access to sufficient energy to provide the predetermined amount of energy that has been requested.

The method may further comprise performing a handshaking operation with the energy-consuming device before the predetermined amount of energy is delivered, and optionally only delivering the predetermined amount of energy if a result of the handshaking operation is considered successful.

There is also disclose an apparatus comprising:
a fuel cell energy source configured to provide energy to an energy-consuming device;
a wireless communication resource in electronic communication with the fuel cell energy source, wherein the wireless communication resource is configured to wirelessly transmit data that relates to the fuel cell energy source to a remote server.

The fuel cell energy source may comprise a fuel cell and/or a fuel storage vessel. The wireless communication resource may be provided as part of the energy-consuming device. The wireless communication resource may comprise a USB modem configured to provide mobile internet access. The wireless communication resource may comprise a USB modem configured to provide mobile internet access to a third party device wirelessly.

The wireless communication resource may be configured to transmit data representative of the amount of energy provided to the energy-consuming device by the fuel cell energy source. The wireless communication resource may be configured to transmit data representative of an amount of fuel that is available to the fuel cell energy source.

The fuel cell energy source may be co-located with the wireless communication resource. The fuel cell energy source may be hardwired to the wireless communication resource.

The apparatus may also comprise a location determining component configured to determine position information. The wireless communication resource may be configured to transmit the position information to the remote server.

There is also disclosed a system comprising:
a fuel cell energy source configured to provide energy to an energy-consuming device;
a wireless communication resource in electronic communication with the fuel cell energy source; and
a server that is remote from the wireless communication resource;
wherein the wireless communication resource is configured to transmit data that relates to the fuel cell energy source to the server.

The wireless communication resource maybe configured to transmit data representative of an amount of fuel that is available to the fuel cell energy source.

The server may be configured to arrange for additional fuel to be provided to the fuel cell energy source in accordance with the data that relates to the fuel cell energy source.

The system may also comprise a location determining component associated with the fuel cell energy source. The location determining component may be configured to determine position information of the fuel cell energy source. The server may be configured to arrange for additional fuel to be provided to the fuel cell energy source at the determined location.

The server may be configured to:
determine an amount of fuel that is available to the fuel cell energy source in accordance with the data that relates to the fuel cell energy source; and
arrange for additional fuel to be provided to the fuel cell energy source in accordance with the determined amount of fuel that is available.

The server may be configured to:
determine a profile of previous fuel usage in accordance with the data that relates to the fuel cell energy source; and
determine an expected time of fuel exhaustion in accordance with the determined amount of fuel that is available and the determined profile of previous fuel usage.

The wireless communication resource may be configured to transmit data representative of an identifier of a fuel storage vessel to the remote server. The identifier may be indicative of a new fuel cartridge.

The server may be configured to store energy-usage data.

There is also disclosed a method of operating any apparatus disclosed herein or any system disclosed herein, the method comprising:
the wireless communication resource transmitting data that relates to the fuel cell energy source to the server.

The method may further comprise the wireless communication resource providing mobile internet access.

The method may further comprise the wireless communication resource transmitting data representative of the amount of energy provided to the energy-consuming device by the fuel cell energy source. The method may further comprise the wireless communication resource transmitting data representative of an amount of fuel that is available to the fuel cell energy source.

The method may further comprise arranging for additional fuel to be provided to the fuel cell energy source in accordance with the data that relates to the fuel cell energy source.

The method may further comprise determining position information and providing the position information to the remote server. The method may further comprise arranging for additional fuel to be provided to the fuel cell energy source at the determined location.

The method may further comprise:
determining an amount of fuel that is available to the fuel cell energy source in accordance with the data that relates to the fuel cell energy source; and
arranging for additional fuel to be provided to the fuel cell energy source in accordance with the determined amount of fuel that is available.

The method may further comprise:
determining a profile of previous fuel usage in accordance with the data that relates to the fuel cell energy source; and determining an expected time of fuel exhaustion in accordance with the determined amount of fuel that is available and the determined profile of previous fuel usage.

The method may further comprise the wireless communication resource transmitting data representative of an identifier of a fuel storage vessel to the remote server.

There may be provided a computer program, which when run on a computer, causes the computer to configure any apparatus, including a communication resource, system, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

There now follows, by way of example only, a detailed description of embodiments of the invention with reference to the following figures, in which.

Figure 1:
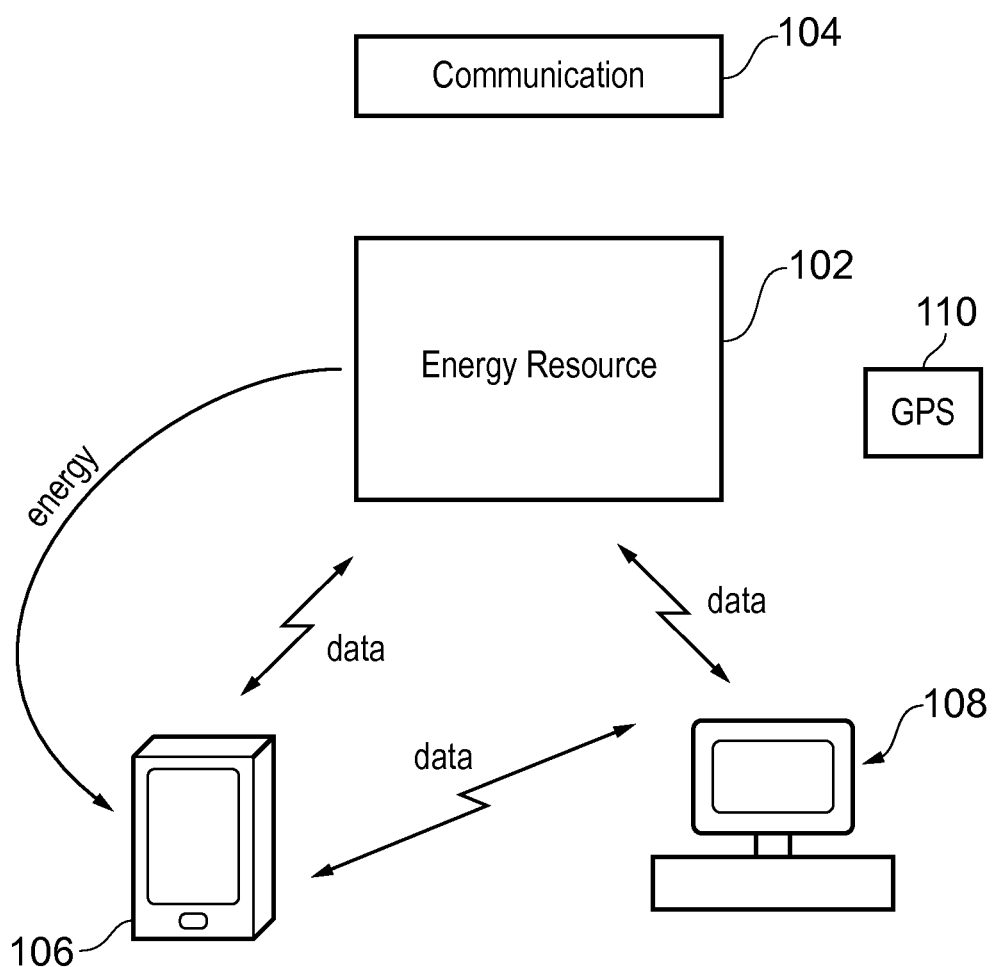
FIG. 1 illustrates apparatus that includes an energy source and a communication resource.

FIG. 1 illustrates apparatus that includes an energy source/resource 102 and a communication resource 104. The energy source 102 is configured to provide energy to an energy-consuming device 106. The energy-consuming device 106 may be a mobile communications device such as a mobile telephone, a smartphone, a tablet computer or a laptop computer. The energy source is 102 embedded within an item of furniture (not shown), such as a chair or a table. In some examples the item of furniture may be located in a shop or public place, such as in a café or a coffee shop, and the energy source 102 can be used to provide electrical energy to customers of the café or coffee shop. The energy source 102 may be a fuel cell energy source, a battery resource, or a connection to a mains electricity supply, for example.

The communication resource 104 is configured to be in communication with a remote server 108 in order to authorise delivery of a predetermined amount of energy by the energy source 102 to the energy-consuming device 106. The predetermined amount of energy may be a predetermined absolute amount of energy (for example a predetermined number of watt-hours); a predetermined relative amount of energy, such as a predetermined portion of the energy-consuming device's capacity for storing energy (for example 30%, 50%, etc. of the energy-consuming device's 106 capacity); or an amount of energy associated with a predetermined period of time (for example, 15 minutes, 30 minutes, etc.). Since the communication resource 104 is configured to authorise delivery of energy by the energy source 102, it will be appreciated that the communication resource 104 is also in electronic communication with the energy source 102. In some examples, the communication resource 104 can send control signals to the energy source 102 in order to control energy delivery. Also, the energy source 102 can send information back to the communication resource 104 in some implementations. This information may be referred to as energy-usage data, and is discussed in more detail below.

The communication resource 104 and the remote server 108 can be in communication with each other in a variety of ways in order to authorise delivery, as will be discussed in more detail below. The remote sever 108 can be considered remote inasmuch as it is not co-located with the communication resource 104 or the energy source 102. The remote server 108 can still be located in the same establishment/building/room as the communication resource 104 and/or the energy source 102 and still be considered remote. The remote sever 108 may not be in wired communication with the communication resource 104.

In some examples, the energy-consuming device 106 may have application software (an App) associated with it that a user can use to gain access to the energy source 102. That is, a user of the energy-consuming device 106 can make a request for the release of energy from the energy source 102 by using a user interface associated with the App. The App can forward that request to the remote server 108. The remote server 108 can then process the request to determine if it is acceptable, for example if one or more request criteria are satisfied. Examples of how to determine if a request is acceptable are provided below.

If the request is accepted then the remote server 108 can provide a signal to the communication resource 104, wherein the signal is representative of an instruction for the energy source 102 to deliver/make available the predetermined amount of energy. At least this last step of the remote server 108 providing a signal to the communication resource 104 can be considered as the communication resource 104 being in communication with the remote sever 108 in order to authorise delivery of the predetermined amount of energy. The signal provided by the remote server 108 may be representative of the specific predetermined amount of energy that is to be delivered to the energy-consuming device 106.

In more detail, an App can be used as follows:

A user plugs a smart device (an example of an energy-consuming device 106) into a smart charger (an example of an energy source 102).

The user launches the App on their smart device 106. In some examples the smart charger 102 may not provide energy to a smart device 106 for more than a fixed period of time (such as 5 minutes) to a unique device in a 24 hour period (or any other fixed period) without a successful App handshake (as will be discussed in more detail below).

The user selects a power plan via the App, for example, 10 minutes, 20 minutes, 30 minutes, or full charge.

The user purchases credit as required, for example if a credit on their account is not sufficient for the selected power plan.

The App interacts with the smart charger 102 (for example via a remote server 108) to manage controlled release of power from the smart charger 102.

In some examples, in the background the App can retrieve instant deals data. The instant deals data may be associated with a status value that can be attributed to the smart device 106 and/or the user. Two example status values are an "encourage to stay" status and an "encourage to leave" status, which can be considered as a first status value and a second status value.

One or more of the following parameters can be processed in order to attribute a status value to the smart device 106 and/or the user, and hence influence which specific instant deals data are retrieved for presenting to a user of the smart device 106:

- The amount of time that the smart device 106 has already been connected to the smart charger 102 for a current visit (for example since the last time that the smart device 106 was connected to the smart charger 102) or in a preceding fixed period of time (for example in the last 6, 12 or 24 hours).
  The remote server 108 may attribute an "encourage to leave" status to the smart device 106 and/or the user if the smart device 106 has been connected to the smart charger 102 for a long time (that is, longer than a threshold value). Similarly, the remote server 108 may attribute an "encourage to stay" status to the smart device 106 and/or the user if the smart device 106 has been connected to the smart charger 102 for a short time (that is, shorter than a threshold value).
- An amount of credit on a user's account.
  The remote server 108 may attribute an "encourage to leave" status to the smart device 106 and/or the user if the amount of credit on the user's account is low (that is, less than a threshold value). Similarly, the remote server 108 may attribute an "encourage to stay" status to the smart device 106 and/or the user if the amount of credit on the user's account is high (that is, greater than a threshold value).
- A current time of day and/or day of the week.
  The remote server 108 may attribute an "encourage to leave" status or an "encourage to stay" status to the smart device 106 based on predetermined times of day and/or days of the week. For example, the remote server 108 may be programmed to assume that certain periods of time will be busier than others and therefore set the "encourage to stay" status for times that are expected to be quiet and set the "encourage to leave" status for times that are expected to be busy.
- The remote sever 108 can apply predefined strategies: for example, "busy-lunch time"—on the assumption that lunchtimes are always busy the remote server 108 could automatically deliver instant-deals to encourage high through-put. So the time-constraint on the deals could be shorter, value of a 3rd party deal could be boosted—this could be via a pre-agreed auction for deals slots.
- Host control signal.
  A host/energy source provider can provide a manually configurable control signal at the host's discretion. For example, the host control signal can be used as an override by a member of staff associated with the host. In the café/coffee shop example, baristas in the café could judge for themselves the types of deals to send to customers depending on their reading of the situation.
- Other parameters can be derived from any of the energy-usage data, user-related data, information related to non-energy related transactions that are described below, and compared with a threshold.

The remote server 108 may apply one or more host-defined rules to determine the status based on the above, or different, parameters. This can enable the owner/provider of the energy source 102 to control how status values are attributed.

If a user is attributed a "encourage to stay" status, then the App can deliver a higher proportion of host-relevant deals. For example, in a café: "free muffin with your next coffee, free chips with any sandwich or panini purchased: Don't get up—order via this App! Expires in 5 minutes".

If a user is attributed a host-defined "encourage to leave" status, then the App can deliver a higher proportion of $3^{rd}$ party deals. For example, "£6 off a £40 shop at AceMarket next door: expires in 20 minutes".

The instant deals associated with a status value may be determined in accordance with location data representative of the location of the smart device 106 and/or the smart charger 102. For example, the remote sever 108 may process the location data to identify $3^{rd}$ parties that are nearby, and therefore deliver relevant $3^{rd}$ party deals. Similarly, the remote sever 108 may process the location data to identify a current location of the user and identify one or more instant deals that have been identified by the specific host as acceptable.

A plurality of instant deals can be provided to a user at the same time. The remote sever can control the proportion of those messages that are considered to encourage a user to stay versus the proportion of those messages that are considered to encourage a user to leave in accordance with the attributed status value.

The instant deal data can comprise one or more of: (i) value information representative of a value of the deal; (ii) supplier information representative of a supplier of the deal (which may be the host or a third party); and (iii) expiry information representative of a time at which the deal expires.

Figure 2:
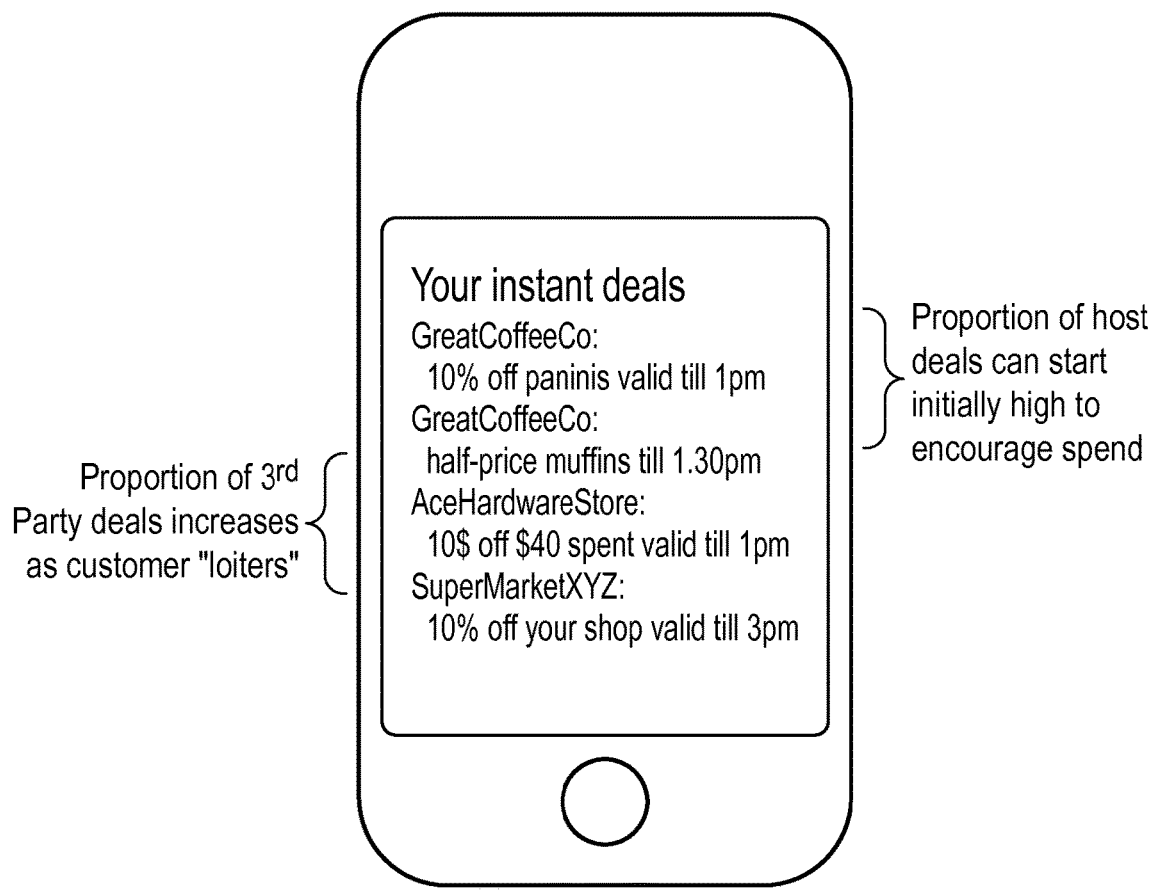
FIG. 2 is an example illustration of an instant deals App page.

FIG. 2 illustrates an example of a plurality of instant deals that could be simultaneously offered to a user of the energy-consuming device 106. FIG. 2 is an example of what an instant deals App page could look like. The proportion of deals from nearby stores (third parties) can be set (for example increased or decreased) and the proportion of deals from the host can be set (for example decreased or increased) in line with the host's strategy, which may for example consider anyone staying longer than 45 minutes as a "loiterer".

Returning to FIG. 1, it will be appreciated that the above discussion of comparing parameters with a threshold can equally apply to comparing the parameter with a plurality of thresholds in order to attribute one of three of more status values.

It will also be appreciated that instead of attributing a single status in line with each of the above parameters, the remote server 108 may instead determine a score (for example on a scale of 1-10) for each of the parameters, and then combine the parameter scores. The combined score can then be compared with one or more threshold values in order to attribute one or more of a plurality of status values. Combining the parameter scores may involve applying weightings to one or more of the parameter scores so that higher priority parameters can have a greater effect on the combined score.

In some examples the communication resource 104 is configured to be in communication with the remote sever 108 via the energy-consuming device 106. For example, the energy-consuming device 106 may be a smart phone, and the communication resource 104 may simply be a data port that is in communication with the smart phone such that the smart phone can act as a conduit data for data between the energy source 102 (via the communication resource 104) and the remote server 108.

The communication resource 104 can be configured to send a signal to the remote server 104 that is representative of a request for energy by the energy-consuming device 106. For example, a user can connect the energy-consuming device 106 to the energy source 102 and provide user input indicative of a predetermined amount of energy that they require. Via the communication resource 102, the energy source 102 can then send a signal to the remote server 104 that is representative of a request for energy by the energy-consuming device 106. If the request is accepted then the remote server 108 can provide a signal to the communication resource 104 that is representative of an instruction for the energy source 102 to deliver the predetermined amount of energy.

The energy source 102, the communication resource 104 and the remote server 108 may together be referred to as a system. The remote server 108 in some examples can store energy-usage data associated with the energy-consuming device 106. The energy-usage data may be representative of an amount of energy that is available to the energy source 102 for delivery. The remote server 108 may be configured to update the energy-usage data in accordance with the predetermined amount of energy that is authorised for delivery. This can be particularly advantageous in examples where the energy source 102 is a battery energy source, a fuel cell energy source, or other energy source that provides energy from a local and limited energy store, because the energy-usage data can be used to arrange for additional energy to be made available to the energy source 102. This could be achieved automatically, for example, by activating a charging circuit for a battery energy source, or by opening a tap in fuel communicating pipework in order to provide additional fuel to a fuel cell energy source. Alternatively, additional energy can be made available to the energy source 102 semi-automatically, for example by providing a message to an operative in the vicinity of the energy source 102 (for example an employee in a café) indicating that the energy source requires refilling or replacing. For example, the message may indicate that a hydrogen fuel storage vessel for a hydrogen fuel cell requires refilling or replacing.

The remote server 108 may store user-related data in addition to, or instead of, the energy-usage data. For example, the user-related data may store personal information about the user (such as name, address, etc.). The user-related data may include information related to energy-related transactions, which may comprise data representative of an account that the user has with an organisation that supplies the energy. The remote server 108 may be configured to update the user-related data in accordance with an amount of energy that is delivered to the energy-consuming device 106. In the example where the energy source 102 is associated with a café, the café may be the organisation that supplies the energy. The account may include a credit balance representative of payments made by the user for the provision of energy, wherein the credit balance is debited when a user makes a request for energy, or when energy is made available from the energy source 102. Alternatively or additionally, the energy-usage data may include: historical information about the user's previous access to the energy source 102, or perhaps access to energy sources at different establishments. The historical information may include: number of accesses to energy sources, frequency of accesses to energy sources, and average or total time accessing an energy source per visit/transaction.

The user-related data may also include information related to non-energy related transactions. For example, in the café example, a non-energy related transaction may include transactions that relate to food and drink purchases that have been made in the café, number of visits to the café, frequency of visits to the café, and average time spent at the café per visit. As indicated above, the remote server 108 can use the information related to non-energy related transactions in order to control communications with the user and/or set a status value for the energy-consuming device 106 and/or set a status value for the user.

The remote server 108 can determine if a request is acceptable by processing the energy-usage data and/or user-related data. The energy-usage data and/or user-related data can be compared with one or more request criteria. For example, the remote server 108 can determine if a request is acceptable by performing one or more of the following:

Processing the user-related data to determine whether or not the user has an appropriate account with an entity that is responsible for providing the energy (such as a café owner). A user may require such an account before energy is delivered.

Processing the user-related data to determine whether or not a credit associated with a user's account is sufficient for the predetermined amount of energy that has been requested.

Processing the energy-usage data to determine if the energy source 102 has access to sufficient energy to provide the predetermined amount of energy that has been requested.

In some examples, the remote server 108 can transmit a first control signal or a second control signal to the energy-consuming device 106 in accordance with the energy-usage data and/or user-related data. The first control signal and the second control signal may be referred to as an incentive control signal and a disincentive control signal. The incentive/disincentive signals may enable/disable functionality on the energy-consuming device 106, for example access to one or more functions associated with the establishment in which the energy source 102 is located (such as wireless internet access) can be enabled or disabled. Alternatively, or additionally, the incentive/disincentive signals can provide associated content to the user, for example the content may be representative of instant deals, e-coupons, e-vouchers, coupons etc that can be used by a user at various establishments.

In the example of FIG. 1, the system also comprises a location determining component, for example a satellite positioning component such as a GPS component 110, that can determine position information. The GPS component 110 may be associated with the energy source 102, the item of furniture in which the energy source 102 is embedded, or the energy-consuming device 106. Irrespective of which of these components the GPS component 110 is associated with, the remote server 106 can be configured to determine a location of the energy source 102 in accordance with the position information due to an assumed close proximity of the components when the energy source 102 is to be used to provide energy to the energy-consuming device 106. The remote server 108 can authorise delivery of the predetermined amount of energy by the energy source 102 at the determined location. The remote sever may have access to a database that provides a link between location coordinates (such as GPS coordinates) and registered locations. In the café example, the determined location may be table 10 at John's Café. That is, the determined location may be an identifier of an individual item of furniture at a specific location. Advantageously, the remote server 108 can then despatch a signal to a communication resource 104 associated with the determined location in order to authorise delivery of energy. Such operation may avoid the need for the communication resource 104 to store data representative of its own location.

In some examples, the energy source 102 (optionally via the communication resource 104) may perform a handshaking operation with the energy-consuming device 106 before the predetermined amount of energy is delivered. The predetermined amount of energy may only be delivered if a result of the handshaking operation is considered successful/acceptable. The handshaking operation can be performed when the energy-consuming device 106 is first connected to the energy source 102. If the handshaking operation is unsuccessful (for example, if App credentials associated with the energy-consuming device 106 are not considered acceptable by software associated with the energy source 102) then the energy source 102 may be controlled such that it is prevented from supplying energy to the energy-consuming device 106. In some examples, this may be achieved by disabling the App from forwarding a request for the release of energy from the energy source 102 to the remote server 108. In other examples, the handshaking operation may be performed as part of the remote server 108 determining if a request for the release of energy is acceptable. Further still, the handshaking operation may be performed as part of, or subsequent to, the remote server providing a signal to the communication resource 104 representative of an instruction for the energy source 102 to deliver the predetermined amount of energy.

Other example locations at which the energy source of FIG. 1 can be located include restaurants, libraries, theme parks, and train stations.

The example of FIG. 1 can provide a means of metering the delivery of power/energy from the grid, a battery, a fuel cell or other energy source to a phone, tablet or other consumer electronics smart device via an App. A user can buy power credit via the App. The power supply/energy source communicates with the App (either directly or indirectly) and only delivers power/energy in line with the correct App credentials, available credit and in line with user input for how much money they wish to spend.

The energy/power source can have an interface which can be configured to only deliver energy/power with a handshake from the App. This level of approval can be considered as an advancement over simply connecting an electric plug to mains grid power, which would automatically always deliver power.

Also, the App can be configured to deliver temporary deals to the smart device/energy-consuming device 106 so as to aid a strategy defined by a host/owner of the charging device—energy source 102. For example, in a café, loiterers can be encouraged to move along. This can be achieved by, during busy periods, the App delivering temporary time-bound deals at local shops (e.g. "£6 off a £40 shop at The Supermarket next door: expires in 10 minutes"). Furthermore, the App could apply a time-quota to prevent someone hogging a power outlet/energy source for too long.

The communication resource 104 may communicate with the remote server 108 via any known means in this example. This can include:

A wired connection.
Bluetooth from the App.
Via the internet or any other network (for example, WiFi).
This can enable data to be captured and processed by a central asset management system, and only then relevant data can be transmitted via the web (or any other means) to café staff.

Figure 3:
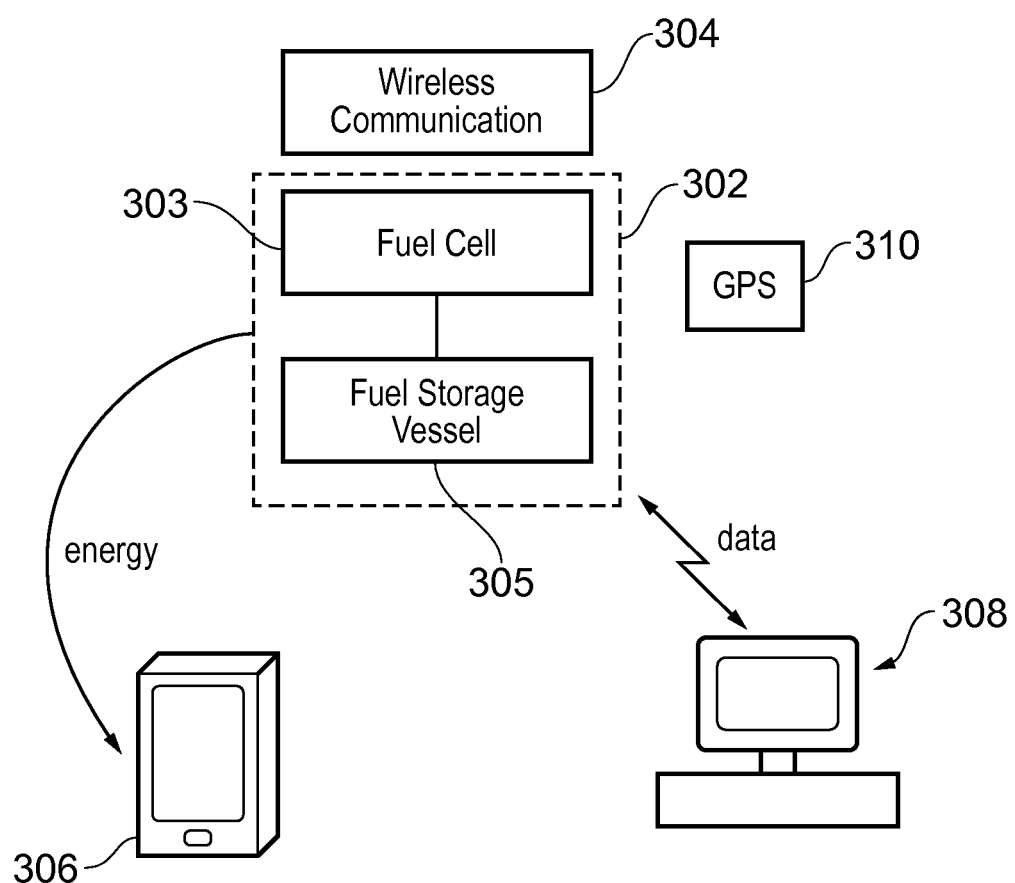
FIG. 3 illustrates apparatus that includes a fuel cell energy source and a wireless communication resource.

FIG. 3 illustrates an apparatus that comprises a fuel cell energy source 302 and a wireless communication resource 304 that is in electronic communication with the fuel cell energy source 302. The fuel cell energy source 302 in this example is illustrated as both a fuel cell 303 (which could be a stack of fuel cells) and a fuel storage vessel 305. It will be appreciated from the description that follows that either the fuel cell 303 or the fuel storage vessel 305 individually, or both the fuel cell 303 and the fuel storage vessel 305 together can be considered as a fuel cell energy source, unless the context requires otherwise.

The fuel cell energy source 302 is configured to provide energy to an energy-consuming device 306, which may be same as the types of device as described above with reference to FIG. 1.

The wireless communication resource 304 can wirelessly transmit data that relates to the fuel cell energy source 302 to a remote server 308. As will be described in more detail below, such communication between the fuel cell energy source 302, the wireless communication resource 304 and the remote server 308 can advantageously enable an energy supplied by one or more energy sources 302 to be better managed, can reduce or eliminate periods of time at which no energy is available to energy-consuming devices 306 and therefore enable uninterrupted processing by devices that rely on the energy source 302.

In some examples, the wireless communication resource 304 can be co-located with the fuel cell energy source 302; for example the wireless communication resource 304 can be integrated with the fuel cell 303 or the fuel storage vessel 305. In other examples, the wireless communication resource 304 can be part of the energy-consuming device 306, especially where the energy-consuming device 306 is a mobile communications device. The wireless communication resource 304 may be hardwired to the fuel cell energy source 302.

The wireless communication resource 304 may comprise a USB modem configured to provide mobile (broadband) internet access, and may be referred to as a dongle. Alternatively, the wireless communication resource may comprise a USB modem configured to provide mobile (broadband) internet access to a third party device wirelessly, which may be referred to as a wingle or a wifi dongle. The mobile internet access can be used to provide a communication link between the remote server 308 and the fuel cell energy source 302.

The wireless communication resource 304 can transmit data representative of the amount of energy provided to the energy-consuming device 306 by the fuel cell energy source 302. Alternatively, the wireless communication resource 304 can be configured to transmit data representative of an amount of fuel that is available to the fuel cell energy source. Both types of data may be referred to as energy-usage data. This data can enable the remote server 308 to determine the amount of fuel that remains in the fuel storage vessel 305. The energy-usage data can be processed by the remote server 308 to arrange for additional fuel to be made available to the fuel cell energy source 302. This could be achieved automatically, for example, by opening a tap to provide additional fuel to the fuel storage vessel 305 or by controlling one or more valves such that an alternative fuel storage vessel can supply fuel to the fuel cell 303 once the fuel storage vessel 305 is empty or once the available fuel falls below a threshold value (for example, 1% or 2%). Alternatively, additional energy can be made available to the energy source 302 semi-automatically, for example by providing a message to an operative in the vicinity of the fuel cell energy source 302 (for example an employee in a café) indicating that the energy source requires refilling or replacing.

In a similar way to that described with reference to FIG. 1, the system also comprises a location determining component such as a GPS component 310, which can determine position information. The GPS component 310 may be associated with the fuel cell energy source 302 or the energy-consuming device 306. The remote server 308 can authorise delivery of the predetermined amount of energy by the energy source 302 at the determined location. The remote sever may have access to a database that provides a link between location coordinates (such as GPS coordinates) and registered locations. In the café example, the determined location may be table 10 at John's Café. That is, the determined location may be an identifier of an individual fuel cell energy source 302 at a specific location. Advantageously, the remote server 308 can then determine a fuel control signal for the establishment in which the fuel cell energy source 302 is located. The remote server 308 may cause information to be displayed on a display screen associated with the host/energy provider. Such information may include a schematic illustration of the establishment along with an indicator for each of the fuel cell energy sources. The indicator can show how much fuel is available to each of the fuel cell energy sources 302. The apparatus of FIG. 3 can enable fuel cells to be incorporated into furniture and cartridge fuel levels to be monitored via a staff interface screen. This information can advantageously enable an employee of the establishment to efficiently manage any refilling or replacing of fuel storage vessels 305 because a single display can be used to show the status of a plurality of fuel storage vessels 305, without requiring wired connections to each fuel cell energy sources 302. Furthermore, without such display information, it may be considered unworkable to retrofit fuel cell energy sources into an existing environment (for example into items of furniture in a café) because: (i) the wiring required would be prohibitive; and (ii) it may not be possible to efficiently and economically refill and replace the fuel storage vessels 305 without the fuel running out, thereby causing a break in the energy supply to the energy-consuming device 306.

The remote server 308 may be configured to determine a profile of previous fuel usage in accordance with the data that relates to the fuel cell energy source 302 that is received from the wireless communication resource 304. In particular, this data may be energy-usage data, as discussed above. The remote server 308 may then determine an expected time of fuel exhaustion in accordance with a determined amount of fuel that is available and the determined profile of previous fuel usage.

In some examples, a service provider can provide both (i) fuel for the fuel cell energy source 302; and (ii) a data allowance for the wireless communication resource 304. Such fuel can be provided by scheduling and managing the delivery of replacement fuel storage vessels 305 or re-filling existing fuel storage vessels 305, for example. Advantageously, a remote server 308 associated with such a service provider can automatically update an account associated with the provision of fuel when an account associated with the provision of data is updated, and vice versa. For example, when a user purchases more fuel (such that their fuel account is credited), their data account can be automatically updated such that more data access over the internet is made available to them (that is, their data account can also be credited without further payment). Similarly, when a user purchases more data, their fuel account can be automatically credited.

The wireless communication resource 304 can transmit data representative of an identifier of a fuel storage vessel 305 to the remote server 308. The identifier can be a serial number associated with the fuel storage vessel 305, for example. The identifier may be indicative of a new fuel storage vessel 305 being used. The remote server 308 can use the identifier to determine if a new fuel storage vessel 305 has been purchased by the user, and if it has, then the user's data account may be automatically updated.

It will be appreciated that various features that are described above with reference to one example can also be implemented with other examples disclosed herein.

It will be appreciated that any components that are described or illustrated herein as being coupled, connected or in communication could be directly or indirectly coupled, connected or in communication. That is, one or more components could be located between two components that are said to be coupled, connected or in communication whilst still enabling the required functionality to be achieved.

It will also be appreciated that any reference to "greater than", "less than", "higher than", or "lower than", etc, can refer to the parameter in question being less than or greater than a threshold value, or between two threshold values, depending upon the context.

The invention claimed is:

1. Apparatus comprising:
    an energy source configured to provide energy to an energy-consuming device upon authorization, wherein the energy source is embedded within an item of furniture, wherein the energy source is a fuel cell energy source, wherein the energy source has an identifier indicating a location of the item of furniture and the energy source, and wherein the energy-consuming device includes an application having credentials associated with the energy-consuming device; and
    a communication resource configured to be in communication with a remote sever,
    wherein the remote server receives a request from the communication resource indicative of a delivery of a predetermined amount of energy from the energy source to the energy consuming device,
    wherein the remote server determines authorization for the request based on energy-usage data associated with the energy-consuming device, at least one parameter associated with the identifier indicative of the energy source and the item of furniture, and a handshaking operation from the application on the energy-consuming device providing the credentials to the remote server, and
    wherein the communication resource authorizes, based upon the authorization from the remote server, delivery of the predetermined amount of energy at the location by the energy source to the energy-consuming device.

2. The apparatus of claim 1, wherein the energy source is configured to be in communication with the remote sever via the energy-consuming device.

3. The apparatus of claim 2, wherein the energy-consuming device comprises a mobile communications device.

4. The apparatus of claim 1, wherein the communication resource is configured to receive a signal representative of an instruction for the energy source to deliver the predetermined amount of energy.

5. The apparatus of claim 1, wherein the predetermined amount of energy comprises:
    a predetermined absolute amount of energy;
    a predetermined relative amount of energy, such as a predetermined portion of the energy-consuming device's capacity for storing energy; or
    an amount of energy associated with a predetermined period of time.

6. The apparatus of claim 1, wherein the communication resource is configured to send a signal to the remote server that is representative of a request for energy by the energy-consuming device.

7. The apparatus of claim 1, wherein the energy source is configured to receive a signal from the remote server that is representative of a specific predetermined amount of energy to deliver to the energy-consuming device.

8. A system comprising:
an energy source configured to provide energy to an energy-consuming device, wherein the energy source is embedded within an item of furniture, and wherein the energy source is a fuel cell energy source, wherein the energy source has an identifier indicating a location of the item of furniture and the energy source, and wherein the energy-consuming device includes an application having credentials associated with the energy-consuming device,
a server that is remote from the energy source, and is configured to store energy-usage data associated with the energy-consuming device; and,
a communication resource configured to be in communication with the server, wherein the server receives a request from the communication resource indicative of a delivery of a predetermined amount of energy from the energy source to the energy consuming device, determines authorization for the request based on energy-usage data associated with the energy-consuming device, at least one parameter associated with the identifier indicative of the energy source and the item of furniture, and a handshaking operation from the application on the energy-consuming device providing the credentials to the server, and
wherein the communication resource authorizes, based on upon the authorization from the server, delivery of a predetermined amount of energy by the energy source to the energy-consuming device in accordance with the energy-usage data.

9. The system of claim 8, wherein the server is configured to process one or more of the following parameters in order to attribute a status value to the energy-consuming device:
an amount of time that the energy-consuming device has already been connected to the energy source for a current visit or in a preceding fixed period of time;
an amount of credit on an account of a user associated with the energy-consuming device;
a current time of day;
a current day of the week;
a host control signal; and,
another parameter derived from one or more of energy-usage data, user-related data, and information related to non-energy related transactions.

10. The system of claim 9, wherein the status value is representative of "encourage to stay" or "encourage to leave".

11. The system of claim 9, wherein the server is configured to process the status value and identify instant deals data for presenting to a user of the energy-consuming device.

12. The system of claim 11, wherein the instant deals data comprises one or more of: (i) value information; (ii) supplier information; and (iii) expiry information.

13. The system of claim 8, wherein the server is configured to transmit a first control signal or a second control signal to the energy-consuming device in accordance with the energy-usage data.

14. The system of claim 13, wherein the first control signal is an incentive control signal and the second control signal is a disincentive control signal, and wherein the incentive control signal and the disincentive control signal are configured to enable/disable functionality on the energy-consuming device.

15. The system of claim 8, wherein the system also comprises a location determining component configured to determine position information, and wherein the server is configured to determine a location of the energy source in accordance with the position information, and authorize delivery of the predetermined amount of energy by the energy source at the determined location.

16. The system of claim 15, wherein the determined location is an identifier of an individual item of furniture in an establishment.

17. The system of claim 8, wherein the server is configured to update the energy-usage data in accordance with the predetermined amount of energy that is authorized for delivery.

18. The system of claim 8, wherein the server is configured to update the energy-usage data in accordance with an amount of energy that is delivered to the energy-consuming device.

19. The system of claim 8, wherein the server is configured to determine if a request for energy is acceptable by processing the energy-usage data, user-related data, or both.

20. The system of claim 19, wherein the server is configured to determine if the request for energy is acceptable by processing the energy-usage data to determine if the energy source has access to sufficient energy to provide the predetermined amount of energy that has been requested.

21. The system of claim 8, wherein the predetermined amount of energy is only delivered if a result of the handshaking operation is considered successful.

22. A method of operating an apparatus or a system,
wherein the apparatus comprises:
an energy source configured to provide energy to an energy-consuming device, wherein the energy source is embedded within an item of furniture, wherein the energy source is a fuel cell energy source, wherein the energy source has an identifier indicating a location of the item of furniture and the energy source, and wherein the energy-consuming device includes an application having credentials associated with the energy-consuming device, and,
a communication resource configured to be in communication with a remote server in order to authorize delivery of a predetermined amount of energy by the energy source to the energy-consuming device;
wherein the system comprises:
an energy source configured to provide energy to an energy-consuming device, wherein the energy source is embedded within an item of furniture, wherein the energy source is a fuel cell energy source, wherein the energy source has an identifier indicating a location of the item of furniture and the energy source, and wherein the energy-consuming device includes an application having credentials associated with the energy-consuming device;
a server that is remote from the energy source, and is configured to store energy-usage data associated with the energy-consuming device; and,
a communication resource configured to be in communication with the server in order to authorize delivery of a predetermined amount of energy by the energy source to the energy-consuming device in accordance with the energy-usage data;
the method comprising:

receiving, at the server, a request from the communication resource indicative of a delivery of the predetermined amount of energy from the energy source to the energy-consuming device;

determining, at the server, authorization for the request based on the energy-usage data, at least one parameter associated with the identifier indicative of the item of furniture, and a handshaking operation from the application on the energy-consuming device providing the credentials to the server; and receiving, at the communication resource, authorization from the server for authorizing delivery of the predetermined amount of energy by the energy source to the energy-consuming device of the apparatus or system; and delivering, based on the authorization, the predetermined amount of energy from the energy source to the energy-consuming device.

23. The method of claim 22, further comprising providing a signal representative of an instruction for the energy source to deliver the predetermined amount of energy.

24. The method of claim 22, further comprising providing a signal that is representative of a specific predetermined amount of energy to deliver to the energy-consuming device.

25. The method of claim 22, further comprising processing one or more of the following parameters in order to attribute a status value to the energy-consuming device:

an amount of time that the energy-consuming device has already been connected to the energy source for a current visit or in a preceding fixed period of time;

an amount of credit on an account of a user associated with the energy-consuming device;

a current time of day;

a current day of the week;

a host control signal; and, another parameter derived from one or more of energy-usage data, user-related data, and information related to non-energy related transactions.

26. The method of claim 25, further comprising processing the status value and identifying instant deals data for presenting to a user of the energy-consuming device.

27. The method of claim 22, further comprising providing a first control signal or a second control signal to the energy-consuming device in accordance with the energy-usage data.

28. The method of claim 22, further comprising:

determining position information associated with the energy source;

determining a location of the energy source in accordance with the position information and;

authorizing delivery of the predetermined amount of energy by the energy source at the determined location.

29. The method of claim 22, further comprising determining if a request for energy is acceptable by processing the energy-usage data, user-related data, or both.

30. The method of claim 29, further comprising determining if the request for energy is acceptable by processing the energy-usage data to determine if the energy source has access to sufficient energy to provide the predetermined amount of energy that has been requested.

31. The method of claim 22, further comprising only delivering the predetermined amount of energy if a result of the handshaking operation is considered successful.

32. A computer program configured to perform the method of claim 22.

* * * * *